April 1, 1952     J. FRYE     2,591,417
ROLL FILM CAMERA

Filed March 8, 1950     3 Sheets-Sheet 1

INVENTOR
*JACK FRYE*

BY Donald F. McCarthy
ATTORNEY

April 1, 1952  J. FRYE  2,591,417
ROLL FILM CAMERA
Filed March 8, 1950  3 Sheets-Sheet 2

INVENTOR
JACK FRYE
BY
Donald F. McCarthy
ATTORNEY

April 1, 1952        J. FRYE        2,591,417
ROLL FILM CAMERA
Filed March 8, 1950        3 Sheets-Sheet 3
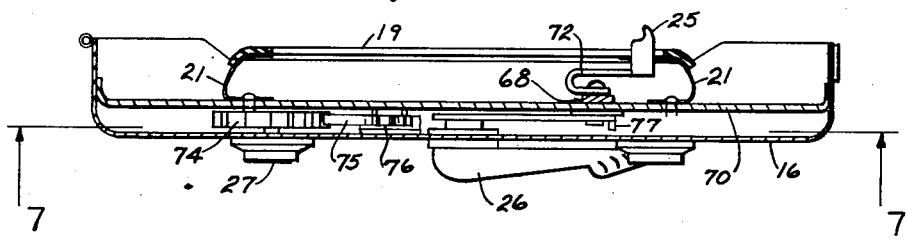
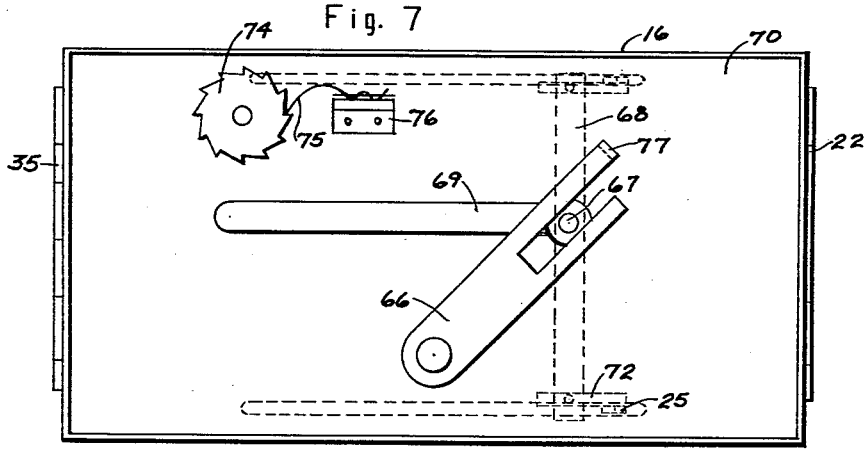
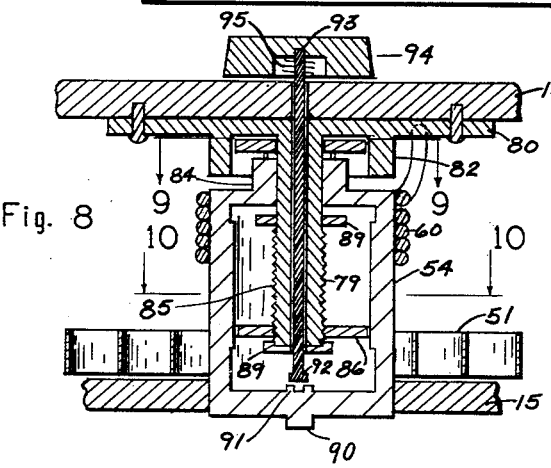
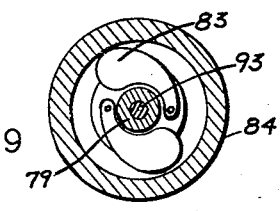
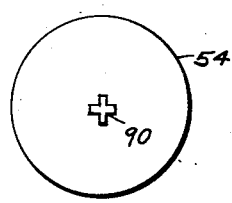
INVENTOR
JACK FRYE
BY Donald F. McCarthy
ATTORNEY Patented Apr. 1, 1952

2,591,417

UNITED STATES PATENT OFFICE 2,591,417

ROLL FILM CAMERA

Jack Frye, Sedona, Ariz.

Application March 8, 1950, Serial No. 148,478

20 Claims. (Cl. 95—31)

This invention relates to photographic cameras, and more particularly to rollfilm cameras of compact design.

It is the primary object of this invention to improve various features of the operating mechanisms in such cameras, and combine new elements in a compact structure.

More particularly, it is an object of this invention to improve the film feeding and spooling in such cameras, and thereby provide a more flexible camera in the hands of the user.

Another object of the invention is to provide such instrumentalities in an effective assembly which coactively result in a camera speedier in operation, simpler in construction, and lessen the hazard of improper handling.

The particular advantages resulting from the proposed features for a rollfilm camera are the ease of loading and film transfer after each exposure, as well as automatic rewind of the exposed film into the original magazine.

Another advantage, inherent in the camera herein described, is that accidental light exposure of the film is prevented. To this end, an interlock is provided which guards against inadvertent opening of the camera.

Other objects and advantages will be apparent from the following description of the invention, pointed out in particularity in the appended claims, and taken in connection with the accompanying drawings, in which:

Fig. 6 is a section of Fig. 2 taken along lines 6—6;

Fig. 7 is a sectional view taken along lines 7—7 of Fig. 6;

Fig. 8 is a cross-section of the automatic film rewind motor;

Fig. 9 is a sectional view taken along lines 9—9 of Fig. 8;

Fig. 10 is a section of Fig. 8 taken along lines 10—10; and

Fig. 11 is a bottom view of the rotor shown in Fig. 8.

Figure 1:
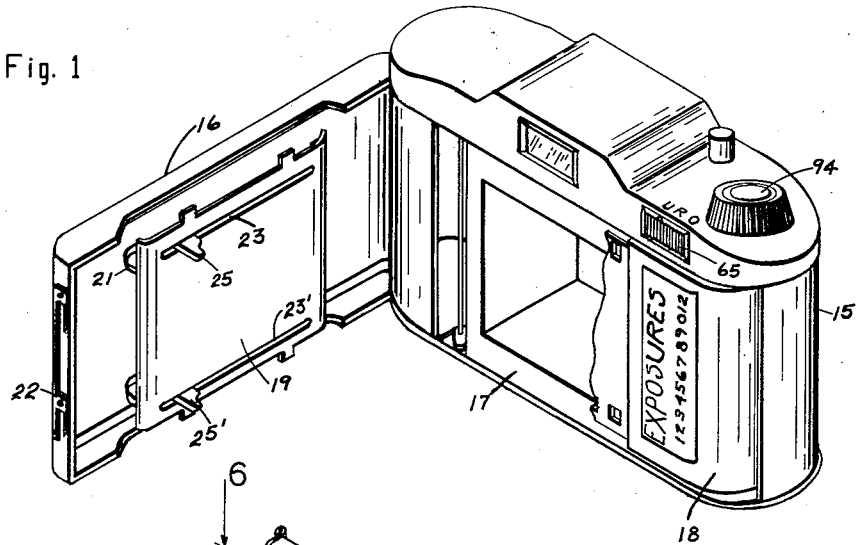
Figure 1 is a perspective view of the camera in open position.

In the art of photography, many improvements have been suggested and found practical pertaining to cameras which are to be used by the amateur photographer. Such improvements originate from the various needs observed, and generally have the purpose of facilitating the use of the camera.

The present invention is similarly directed to features which will enhance the utility of the camera in certain of its operations. In a broader aspect, the invention provides improvements which may be summarized as follows: The magazine compartment of the camera accommodates a rollfilm magazine from which film is pulled out by means of sliding gripping members and forced into a storage compartment after exposure. The film need not have a backing paper, nor is it necessary for the user to place the leader into a rewind spool. After exposure of any desired frames, the film may be rewound onto the original spool of the magazine automatically by means of a spring operated motor of special construction.

An interlocking mechanism is provided which prevents opening of the camera at any time while a portion of the film is out of the magazine, so that accidental exposure to light of the picture-exposed film is prevented. Automatic means are also provided to release the pressure of the pressure plate behind the film at the exposure area, so that the film may easily be transferred from the storage compartment into the magazine without damage which the friction of the pressure plate would otherwise cause.

All the above described operations may be controlled by a single manual button which enables the user to have a free hand in the loading of the camera.

The rewind mechanism embodies in a simple cylindrical housing an automatically actuated speed governor and a similarly actuated start and stop mechanism for controlling the total number of revolutions of the rotor which turns the film spool of the magazine. This enables pretensioning of the spring for sufficient storage of power.

The number of exposed frames are indicated upon each motion of the film transport lever in a simple manner, and this indication may be reset at any time. In view of the fact that the exposed film is rewound into the original magazine, it is feasible to make as many exposures as desired, and take out the magazine when the film is only partially exposed. It may be replaced later, at any time, to complete all the exposures. This is especially advantageous at times when a film of different emulsion speed is needed, or when change from black and white to color are to be made without sacrificing the unexposed portion of the film in the loaded camera.

As an added convenience, the film magazine has printed markings which are readily visible indicating all the frames the loaded spool will take. These markings may consist simply of numbers 1 to 12, or other series, depending upon the total number of frames the film has, and are easily erasable by the user to serve as a future reference for such exposures which may still be made with the roll.

All in all, the above features, in accordance with this invention, have been embodied in practical forms and placed into a combinative entity, for example, in a camera of the candid type. These features, in the practical embodiments shown, may also be advantageously applied to other type of cameras, such as reflex or view cameras.

A fuller understanding of the invention may be had by reference to the drawings where similar reference characters indicate identical components as they appear in the various figures. In Figure 1, the back portion of the camera is shown comprising a casing 15 which has a cover 16 for closing the film compartments and the exposure area of the camera, generally defined by the frame 17. The front portion of the camera is not shown in detail, inasmuch as this invention is not concerned with the particular type of shutter, lens, or lens mount which may be utilized. As mentioned before, the inventive embodiments can be applied to most any type of camera with such modification as may be demanded by the basic construction thereof.

The casing 15 has two compartments, one for receiving the film magazine 18, and the other for storing the exposed film. The cover 16 carries the pressure plate 19 which, when closed, presses the film with sufficient force against the frame 17 so that, at the exposure area, the film lies flat. The pressure plate 19 is resiliently mounted on the cover 16 by means of springs 21 seen in greater detail in Fig. 6. A lock 22 is mounted on the end of the cover 16 which cooperates with a latch mechanism, to be described later. The pressure plate 19 has also slits 23 through which the claws 25 of the film transport mechanism extend. In the camera structure herein shown, by way of example, a perforated film is utilized and, therefore, in the film transport the gripping members are the claws 25 which cooperate with the perforations in the film. In other types of cameras, different gripping devices may be employed, such as friction pads in place of the claws for drawing the film out of the magazine.

Figure 2:
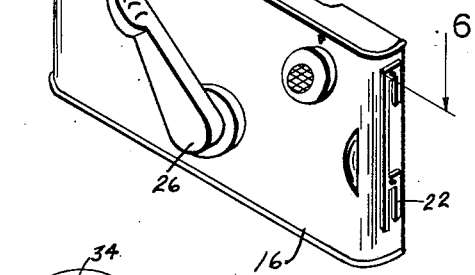
Fig. 2 is a similar view of the camera cover.

Mounted on the cover 16, as seen in Fig. 2, is the film transport lever 26 for the manual operation of the film transport mechanism. In the left-hand corner of the cover 16 is a rotating indicator 27 for the number of exposed frames, cooperating with an index marking 28. The indicator 27 is automatically actuated upon transport positioning of the lever 26. In the right-hand corner of the cover 16 a similar marking device may be employed, if desired, for indicating other conditions, for example, the type of film used in the camera. However, this is not connected with the operating features herein presented.

Figure 3:
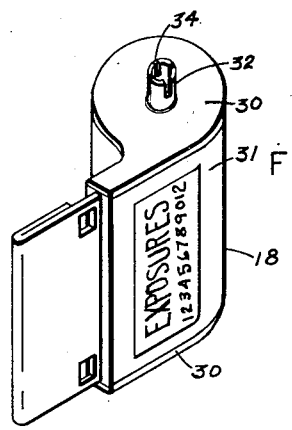
Fig. 3 is a perspective view of the film magazine.

The magazine 18, as seen in Fig. 3, conforms to standard dimensions and is of conventional construction. It is formed of cover plates 30 which fit over the housing 31. The film passes through a slit in the housing and a portion thereof may be bent back so as to prevent accidental return into the magazine. A shaft 32 extends from the magazine and is part of the film spool inside the magazine, not shown here in detail. The shaft 32 has key slots 34 for engaging, when placed into the camera, the key 98 (Figs. 8 and 11) of the rewind mechanism.

Figure 4:
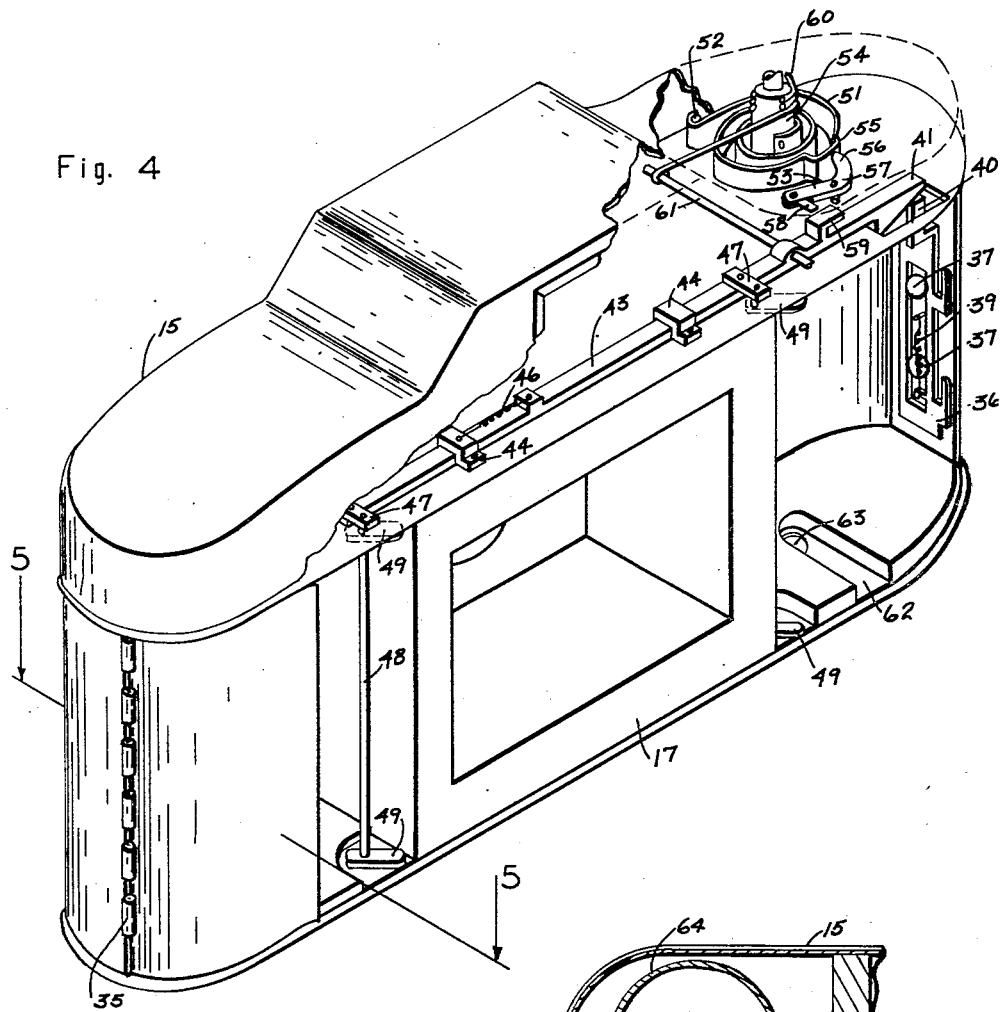
Fig. 4 is an enlarged perspective view of the back of the camera with the cover removed, and portions cut out to illustrate the mechanisms.

Referring to Fig. 4, a more detailed view is presented of the mechanical features incorporated into the casing 15. For a clearer illustration, the cover 16 which swings on the hinge 35 is not shown. Inside the magazine compartment is seen the latch 36 which is slidably supported by the rivets 37. A spring 39 is provided to maintain the latch normally in an upward position. The lock 22 on the cover (Fig. 2), and the latch 36, are properly shaped so that closing of the cover will effectuate the interlocking between the lock and latch members.

The opening of the latch is inter-related with other functional devices in the camera. It will be seen that the latch 36 has an extension 40 which cooperates with a cam 41 of the slide bar 43. The latter is a master operating member and runs parallel with the casing, and is held by straps 44 affixed thereto. A spring 46 urges the bar 43 into the normally upward closed position of the latch 36. The bar 43 also has two transverse members 47, each of which interconnects with a lever rod 48. (Of these, only the one near the storage compartment is shown in detail.) The lever rods 48 are pivoted in the casing 15, and each has two lever arms 49 which move in a recess in, and are normally flush with, the casing 15 when the bar 43 is in the locking position. It is seen that when the bar 43 is moved against the spring 46 in the direction to the right, the lever arms 49 will extend from the casing as the rods 48 are rotated. The purpose of this will be described later.

Continuing with the description of Fig. 4, above the magazine compartment is seen, in part, the rewind mechanism comprising a spring actuated motor. The leaf spring 51 of this motor is affixed at one end to the casing 15 by means of the pin 52. The other end is fastened to the rotor 54. The spring 51 has a cam portion 55 which cooperates with a follower 56 forming part of a lever 57 pivoted to the casing 15 and biased by the spring 53. This lever has a pivoted bolt portion 58 which may slide into a stop 59 on the bar 43. The rotor 54 has a unidirectionally acting holding means in the form of a helical spring clutch 60 shown in partial detail. One end of the spring clutch terminates in a cross bar 61 attached to the bar 43, which extends also from the casing to support the manual release 65 (Fig. 1). The other end of the spring clutch is affixed to the casing (Fig. 8).

Figure 5:
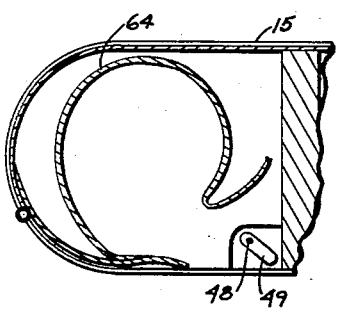
Fig. 5 is a section of Fig. 4 taken along lines 5—5.

The magazine compartment has a cutout portion 62 for easy insertion of the magazine, there being provided also an opening 63 to accommodate a lower shaft extension of the film spool which some magazines may use. The storage compartment of the camera employs no spool and comprises a resilient film guide strip 64, as seen in the cross-sectional view of Fig. 5. By means of this strip, the film forced into the magazine will follow the curvature of the strip and roll upon itself while the guiding strip expands in the compartment.

As previously mentioned, the film is drawn from the magazine in the magazine compartment by means of the claw members 25 and is forced into the storage compartment. The transport is effected in a very simple manner, the mechanism of which is seen in greater detail with reference to Figs. 6 and 7. The transport lever 26 extends into the cover 16 and terminates in a forked member 66 which accommodates the pin 67 of the cross bar 68. The pin 67 is adapted to slide in a slot 69 cut in the inner supporting plate 70. The cross bar 68 carries the spring supports 72 which hold the claws 25. It will be readily seen that displacing the transport lever 26 will cause similar angular displacement of the forked member 66, compelling the cross bar 68 to slide in the direction of the movement of the lever. The claws 25 which normally rest on the magazine housing will, as the lever 26 is turned, engage the perforations of the film and pull from the magazine a sufficient length required to make one exposure frame. When the lever 26 is returned to the starting position, the curved end of the claws 25 and the resilient supports 72 permit the claws to ride over the perforations of the film without gripping any part thereof. This action is also aided by the pressure plate 19 which exerts sufficient pressure to prevent any back slippage of the film.

The film transport herein described is also interconnected with a simple exposure counter comprising the exposure indicator 27 which extends into the cover 16 and terminates in a ratchet wheel 74. A spring 75, held by a support 76 affixed to the supporting plate 70, engages the ratchet face of the wheel 74 and holds it against free movement. The forked member 66 has a pawl 77 which, at the extreme position of the lever, engages the ratchet face of the wheel 74 and actuates the latter for one step at each film transport position. Exposure indicator 27 may also be rotated by hand in one direction against the spring 75 in order that it may be set to zero at the time the magazine is loaded into the camera.

Now referring to Figs. 8, 9, 10 and 11, details of the rewind mechanism are seen in the various sectional views. The rotor element 54 comprises a hollow cylindrical body rotatably supported on the pinion 79 which is part of a base plate 80 attached to the casing 15. The base plate has also an extending circular drum 82 which is coaxial with the pinion 79. The inner face of drum 82 serves as a frictional contact for the centrifugal pallets 83 pivotally attached to the sleeve portion 84 of the rotor 54.

The pinion 79 has a threaded portion 85 on which rides a disc 86 concentrically arranged with respect to the pinion 79. The disc 86 has peripheral grooves 87 which cooperate with longitudinally running guides 88 on the inner surface of the rotor 54. At each end of the threaded portion 58 is a stop 89 against which the disc 86 abuts at the two extreme ends of its travel over the spindle 79. Since the disc 86 slides also over the guides 88 which are part of the rotor 54, further rotation of the latter is checked in the particular direction which causes the disc 86 to abut against either one or the other stops 69. By virtue of this limit mechanism just described, a total number of revolutions of the rewind mechanism is predetermined, and the motor spring 51 may be properly pretensioned tending to move the rotor 54 in the direction of rewind. In the pretensioned condition, the disc 86 is at the lower extreme of its travel over the spindle 79 and abuts against the lower stop 89.

On the outer wall of the cylindrical rotor 54 is wound the spring clutch 60 which was previously mentioned in connection with Fig. 4. One end of spring is embedded in the base plate 80. The winding of the clutch is in such direction that when the rotor 54 is turned against the action of the leaf spring 51 reverse rotation thereof is prevented, inasmuch as such rotation will tend to tighten the hold of the clutch 60. In other words, the rotor 54, by frictional engagement of the turns of the clutch 60, will aid the winding turns to follow the normal action of gripping the outer surface of the rotor. On the other hand, movement of the rotor 54 in the direction against the action of spring 51 will have an opposite effect on the clutch 60, tending to loosen the frictional hold of each turn. Only such force is required to turn the rotor 54 in the direction against the hold of the spring 51 as is necessary to overcome the power of the latter. No friction is exerted by the clutch 60 in this direction of movement.

The rotor 54 extends into the lower part of the casing 15 and has a key 90 which, as previously mentioned, engages the key slots 34 of the shaft 43 of the film spool in the magazine 18. On the inner wall of the rotor 54 opposite the key 90 is a slotted portion 91 which faces the key 92 of the shaft 93 which slides within the pinion 79 and extends above the casing 15 terminating in the knob 94. The shaft 93 is held by the spring 95 placed in a cut-out portion of the knob 94 in such a position as to keep the key 92 out of engagement with the slotted portion 91. The knob 94, together with the shaft 93, provides a manual turning of the rotor 54 if for any reason the spring 51 fails to rewind. Since the entire motor assembly is enclosed in the casing 15, there is no direct access to it unless the camera is dismantled. By this means, and for the reason which will be further exemplified in connection with the description of the operation of the various coactive instrumentalities presented, the need for a manual actuation of the rotor mechanism will be more significant.

In describing the operation of the combined mechanisms, a collective view of the various figures of the drawings should be considered. Let it be assumed that a magazine is placed into the magazine compartment and the shaft 32 of the spool in the magazine engages the key 90 of the rewind rotor. Now, when the cover 16 is closed, the lock 22 will engage the latch 36 so that the cover is held in the closed position. As long as the transport lever 26 is not moved and no film is pulled out of the magazine, the cover may freely be opened again by sliding the manual release 65 in the direction against the spring 46 until the cam 41 depresses the extension 40 of the latch 36. This position is indicated by the letter "O" on the casing. It is to be noted that the release 65 has three positions, of which the normal position indicated by the letter "U" is for the use of the camera, the letter "R" signifies the mid-position for rewind, and the letter "O" stands for opening.

When the transport lever 26 is moved to the position shown in Fig. 2, a length of film is pulled out by the claws 25 for the first exposure. The film is held flat against the frame 17 by means of the pressure plate 19. Upon such movement, the rotation of the film spool coupled to the rotor 54 by means of the key 90 and shaft 32 will turn the rotor and wind the spring 51. Thus, the cam surface 55 will leave the follower 56 and the lever 57, urged by the spring 53, is free to move in such a position as to slide the bolt 58 into the stop 59 provided on the bar 43. The latter is now in a locked position and cannot be moved by the release 65 to such an extent as to reach the open position. Only a limited movement of the release 65 is now possible, sufficient to release the spring clutch 60 which, as mentioned before, is intercoupled with the cross bar 61. This limited position is the rewind position marked "R" so that the clutch 60 is first released and the spring 51 may exert its energy to cause the rotor 54 to rotate and rewind the film back into the spool. When this is completed, the bolt 58 is removed from the stop 59, since the cam surface 55 is again in the original position. The cover may then be opened by moving the release 65 into the open position and the bar 43 can slide to the extent necessary to release the latch 36.

It is to be noted that the rewind position of the bar 43 also actuates the rods 48 so that the levers 49 extend in the direction transverse to the pressure plate 19 and lift the latter to release the pressure on the film against the frame 17. The action of the spring motor is fairly rapid and when a greater length of film has already been exposed, the fast rewind would be damaging to the film if the pressure plate remains in contact therewith. The force exerted by this plate for the slow transport of the film from the magazine into the storage compartment is of no consequence, and for this operation the pressure plate 19 may remain in its normal film engaging position.

When the bar 43 is in the rewind position so that the spring clutch will not hold the rotor, the latter is rotated by the unwinding spring 51. The pressure exerted by this spring varies with the extent of its tensioning, which also depends upon the length of film fed into the storage compartment. With the full length used, the tension of the spring 51 is at its maximum, and a sudden release of this force would tend to rewind the film at a higher rate. The motion of the rotor, however, is checked by the centrifugal pallets 83 which, due to this force, expand and frictionally engage the drum 82. This friction slows the speed of the rotor drum to a normal rewind over the entire movement of revolutions which the rotor 54 has to make to rewind back the entire length of film into the magazine. The effective braking action of the simple speed governor, shown here, by the centrifugal pallets 83 engaging the drum 82 may be accentuated by suitable gearing between the sleeve 84 and the rotor 54 to permit the pallets 83 to revolve faster than the rotor. Such gearing is a matter of choice, depending upon design factors, and for this reason, is not illustrated here.

The advantage of a spring operated rewind will be appreciated by all those who go through the tedious process in prior art cameras of threading a film onto a second spool and winding every frame by means of a knob. After exposure, the film spools have to be transposed for the next operation. In the present camera, a flip of the finger will almost instantaneously respool the film into the original magazine. Should the automatic rewind fail for any reason, the manual rewind by the knob 94 may be used. The user may rewind the film into the spool by depressing the knob 94 against spring 95 and turn it until the key 92 engages the key-way of the slotted member 91. A mechanical coupling is thereby achieved, and the rotor 54 of the rewind motor may then be turned in any direction by this manual rewind knob. This aids also in the loading of the camera to locate the key 90 into the slots 34 of the inserted spool. The faces of these may not always be in cooperative position, and since the manual rewind allows rotation of the rotor 54 in both directions, a slight turn of the knob 94 will suffice to bring these in proper engagement.

What I claim is:

1. In a rollfilm camera, a casing having a film magazine compartment and an exposed film storage compartment, an exposure area between said compartments comprising a frame, a cover hinged to said casing and overlying said frame and compartments, film transport means affixed to said cover and extending into said casing, for transporting film from said magazine compartment into said storage compartment after each exposure, locking means for retaining said cover in closed position, a power operated film rewind mechanism for returning the film from said storage compartment to said magazine compartment, said mechanism being in a tensioned position while there is film in said storage compartment, and in a rewound position when said film is returned into said magazine compartment, a manual release for said locking means, and means for retaining said release during said tensioned position and for releasing said retaining means upon said rewound position of said mechanism.

2. In a rollfilm camera, a casing having a film magazine compartment and an exposed film storage compartment, an exposure area between said compartments comprising a frame, a cover hinged to said casing and overlying said frame and compartments, film transport means affixed to said cover and extending into said casing, for transporting film from said magazine compartment into said storage compartment after each exposure, locking means for retaining said cover in closed position, a power operated film rewind mechanism for returning the film from said storage compartment to said magazine compartment, said mechanism being in a tensioned position while there is film in said storage compartment, and in a rewound position when said film is returned into said magazine compartment, a manual release for said locking means, and means actuated by said rewind mechanism for retaining said release during said tensioned position and for releasing said retaining means upon said rewound position of said mechanism.

3. In a rollfilm camera, a casing having a film magazine compartment and an exposed film storage compartment, an exposure area between said compartments comprising a frame, a cover hinged to said casing and overlying said frame and compartments, film transport means affixed to said cover and extending into said casing, locking means for retaining said cover in closed position, a film rewind mechanism including a power spring having tensioned and expanded positions, a manual release for said locking means, and means interconnected with said spring for retaining said release during tensioned position thereof and for releasing said retaining means upon expanded position.

4. In a rollfilm camera, a casing having a film magazine compartment and an exposed film storage compartment, an exposure area between said compartments comprising a frame, a cover hinged to said casing and overlying said frame and compartments, film transport means affixed to said cover and extending into said casing, locking means for retaining said cover in closed position, a film rewind mechanism including a power spring having tensioned and expanded positions, a manual release for said locking means including a sliding bar, and means interconnected with said spring for retaining said bar during tensioned position, and for releasing said bar upon expanded position of said spring.

5. In a rollfilm camera, a casing having a film magazine compartment and an exposed film storage compartment, an exposure area between said compartments comprising a frame, a cover hinged to said casing and overlying said frame and compartments, film transport means affixed to said cover and extending into said casing, locking means for retaining said cover in closed position comprising a sliding latch plate having an extension, a lock on said cover cooperating with said latch plate, a film rewind mechanism including a power spring having tensioned and expanded positions, a sliding bar manually operable for actuating said rewind mechanism, a cam on said bar engaging said extension for actuating said latch, and means interconnected with said spring for retaining said bar during tensioned position thereof and for releasing said bar upon expanded position, whereby opening of said cover is prevented while said spring is tensioned.

6. In a rollfilm camera, a casing having a film magazine compartment and an exposed film storage compartment, an exposure area between said compartments comprising a frame, a cover hinged to said casing and overlying said frame and compartments, film transport means affixed to said cover and extending into said casing, for transporting film from said magazine compartment into said storage compartment after each exposure, locking means for retaining said cover in closed position comprising a sliding latch plate having an extension, a lock on said cover cooperating with said latch plate, a film rewind mechanism for returning the film from said said storage compartment into said magazine compartment, including a helical leaf spring having a tensioned position while there is film in the storage compartment and having an expanded position when said film is returned into said magazine compartment, a sliding bar manually operable for actuating said rewind mechanism, a cam on said bar engaging said extension for actuating said latch, and means for retaining said bar during said tensioned position thereof and for releasing said bar upon said expanded position, whereby opening of said cover is prevented while said spring is tensioned, said means comprising a stop on said bar, a pivoted lever having a follower portion and a bolt portion, a peripheral cam on said spring cooperating with said follower portion for actuating said lever and thereby positioning said bolt portion against said stop.

7. In a rollfilm camera, a casing having a film magazine compartment and an exposed film storage compartment, an exposure area between said compartments comprising a frame, a cover for said casing overlying said frame and said compartments, a rollfilm magazine adapted to be inserted in said first-mentioned compartment, a film feed device in said cover including gripping means extending into said casing and engaging said film for sliding it past said frame and into said storage compartment, a spring power operated rewind mechanism for returning said film from said storage compartment into said magazine, a pressure plate between said film and said cover pressing said film against said frame, and means interconnected with said mechanism and operable upon actuation thereof for releasing the pressure of said plate while the film is rewound back into said magazine.

8. In a rollfilm camera, a casing having a film magazine compartment and an exposed film storage compartment, an exposure area between said compartments comprising a frame, a cover for said casing overlying said frame and said compartments, a rollfilm magazine adapted to be inserted in said first-mentioned compartment, a film feed device in said cover including gripping means extending into said casing and engaging said film for sliding it past said frame and into said storage compartment, a spring power operated rewind mechanism for returning said film from said storage compartment into said magazine, a resiliently mounted pressure plate between said film and said exposure frame maintaining said film thereagainst, and means interconnected with said mechanism and operable upon actuation thereof for releasing the pressure of said plate while the film is rewound back into said magazine, comprising a plurality of levers recessed in said casing and upon actuation engaging said plate and exerting a force in a direction transverse thereto.

9. In a rollfilm camera, a casing having a film magazine compartment and an exposed film storage compartment, an exposure area between said compartments comprising a frame, a cover for said casing overlying said frame and said compartments, a rollfilm magazine adapted to be inserted in said first-mentioned compartment, a film feed device in said cover including gripping means extending into said casing and engaging said film for sliding it past said frame and into said storage compartment, a spring power operated rewind mechanism tensioned upon actuation of said feed device for respooling said film from said storage compartment into said magazine, a pressure plate between said film and said cover pressing said film against said frame, a manual release for said rewind mechanism including a sliding bar, a pair of levers adjacent opposite sides of said frame recessed in said casing, pivots for said levers and link means interconnecting said pivots with said bar, whereby said levers upon actuation of said bar extend transversely to said plate and press thereagainst, said plate being lifted from frictional contact with said film while the latter is rewound back into said magazine.

10. In a rollfilm camera, a casing having a film magazine compartment and an exposed film storage compartment, an exposure area between said compartments comprising a frame, a cover for said casing overlying said frame and said compartments, a rollfilm magazine adapted to be inserted in said first-mentioned compartment, a film feed device in said cover including a pair of claw members resiliently mounted on a crossbar extending into said casing and engaging perforations in said film, a lever on the outer side of said cover having an arcuate path, an arm for said lever inside said cover, a link interconnecting said arm with said bar for sliding said members longitudinally with respect to said cover and threading said film past said frame and into said storage compartment, a spring power operated rewind mechanism for returning said film from said storage compartment into said magazine, a pressure plate between said film and said cover pressing said film against said frame, and lifting means interconnected with said mechanism and operable upon actuation thereof for releasing the pressure of said plate while the film is rewound back into said magazine.

11. In a rollfilm camera, a casing having a film magazine compartment and an exposed film storage compartment, an exposure area between said compartments comprising a frame, a cover for said casing overlying said frame and said compartments, a rollfilm magazine adapted to be inserted in said first-mentioned compartment, a film feed mechanism in said cover including a pair of claw members resiliently mounted on a crossbar extending into said casing and engaging perforations in said film, a lever on the outer side of said cover having an arcuate path, an arm for said lever inside said cover, a link interconnecting said arm with said bar for sliding said members longitudinally with respect to said cover and threading said film past said frame and into said storage compartment, an exposure number indicator on the outer face of said cover, means on the inner face of said cover for moving said indicator and means interconnected with said mechanism for actuating said moving means.

12. The combination in accordance with claim 11, wherein said means for moving said indicator comprises a ratcheted wheel, a resilient spring affixed to the inner face of the cover engaging said wheel against movement and said actuating means comprises a pawl on said arm engaging said ratchet at the extreme position of said lever.

13. In a rollfilm camera, a film magazine comprising a housing, a spool therein having a shaft extending therefrom, a slot in said housing permitting passage of the film from the magazine, a compartment in said camera for receiving said magazine, a spring driven motor having a leaf spring affixed to a rotor extending into said compartment and engaging said shaft, frictional unidirectional holding means for said rotor operable to automatically release the hold upon rotation in the direction of said shaft for unwinding the film from said spool and to exert said hold against the tension of said spring tending to rewind said film onto said spool, and manually operated means for disengaging said holding means whereby said film is automatically respooled into said magazine.

14. In a rollfilm camera, a film magazine comprising a housing, a spool therein having a shaft extending therefrom, a slot in said housing permitting passage of the film from the magazine, a compartment in said camera for receiving said magazine, a spring driven motor having a leaf spring affixed to a rotor extending into said compartment and engaging said shaft, a frictional unidirectional holding means for said rotor operable to release the hold upon rotation in the direction of said shaft for unwinding the film from said spool and to exert said hold against the tension of said spring tending to rewind said film onto said spool, and manually operated means for disengaging said holding means, whereby said film is automatically respooled into said magazine, and means for controlling the number of revolutions of said rotor within predetermined limits in either direction of rotation.

15. In a rollfilm camera, a film magazine comprising a housing, a spool therein having a shaft extending therefrom, a slot in said housing permitting passage of the film from the magazine, a compartment in said camera for receiving said magazine, a spring driven motor having a leaf spring affixed to a rotor extending into said compartment and engaging said shaft, a frictional unidirectional holding means for said rotor operable to release the hold upon rotation in the direction of said shaft for unwinding the film from said spool and to exert said hold against the tension of said spring tending to rewind said film onto said spool, and manually operated means for disengaging said holding means, whereby said film is automatically respooled into said magazine, means for controlling the number of revolutions of said rotor within predetermined limits in either direction of rotation, and means for governing the speed of rotation of said rotor when actuated by said leaf spring.

16. In a rollfilm camera, a film magazine comprising a housing, a spool therein having a shaft extending therefrom, a slot in said housing permitting passage of the film from the magazine, a compartment in said camera for receiving said magazine, a spring driven motor having a leaf spring affixed to a rotor extending into said compartment and engaging said shaft, a frictional unidirectional holding means for said rotor operable to release the hold upon rotation in the direction of said shaft for unwinding the film from said spool and to exert said hold against the tension of said spring tending to rewind said film onto said spool, and manually operated means for disengaging said holding means, whereby said film is automatically respooled into said magazine, means for controlling the number of revolutions of said rotor within predetermined limits in either direction of rotation, and centrifugal friction means for governing the speed of rotation of said rotor when actuated by said leaf spring.

17. In a rollfilm camera, a casing, a film magazine comprising a housing, a spool therein having a shaft extending therefrom, a slot in said housing permitting passage of the film from the magazine, a compartment in said casing for receiving said magazine, a spring driven motor having a leaf spring affixed to a rotor extending into said compartment and engaging said shaft, a frictional unidirectional holding means for said rotor operable to release the hold upon rotation in the direction of said shaft for unwinding the film from said spool and to exert said hold against the tension of said spring tending to rewind said film onto said spool, said holding means comprising a helical spring clutch wound around said rotor in the direction of the rewind rotation thereof, one end of said spring being anchored in said casing and the other end connected to a manually operated sliding bar for expanding said spring and thereby disengaging said holding means whereby said film is automatically respooled into said magazine.

18. The combination as defined in claim 17, wherein said manually operated sliding bar for expanding said spring clutch is strapped to the casing and has a spring biasing it against movement in the direction of release and a lateral extending rod affixed thereto for engaging the terminal end of said spring clutch.

19. In combination with a rollfilm camera including a camera body, a film magazine containing a spool from which film is unwound which has been exposed, means for automatically rewinding the exposed film onto said spool comprising a fixed spindle attached to the camera, a hollow cylindrical rotor rotatably mounted thereon, a pretensioned leaf spring having one end attached to the outer wall of said rotor and the other end to said body, a threaded portion on said spindle inside said cylinder, a threaded disc concentrically arranged to cooperate with the thread on said spindle and having opposite peripheral grooves, guides on the inner wall of said cylinder in the direction parallel to said spindle and engaging said grooves, whereby said disc is prevented from rotating and caused to slide across said shaft over said threaded portion, stops at both ends of said threaded portion for engaging said disc in both directions of movement, the distance between said stops determining the number of revolutions of said rotor.

20. The combination in accordance with claim 19, wherein said spindle is hollow, a shaft rotatably and slidably arranged within said spindle extending at one end through the camera body, a knob attached to said extending end, said other end terminating in a key inside said rotor and a slot in said rotor, means for urging said key normally out of engagement with said slot, whereby manual turning of said rotor may be effected by means of said knob upon sliding said shaft into engagement with said slot.

JACK FRYE.

REFERENCES CITED

The following references are of record in the file of this patent:

UNITED STATES PATENTS

| Number | Name | Date |
|---|---|---|
| 2,336,279 | Mihalyi | Dec. 7, 1943 |